Feb. 28, 1956 — E. V. HUGHES — 2,736,532
TOOL FOR PUSHING OR PULLING FISH TAPE THROUGH A CONDUIT
Filed April 23, 1954

INVENTOR.
ELMER V. HUGHES
BY
ATTORNEYS

United States Patent Office 2,736,532
Patented Feb. 28, 1956

2,736,532

TOOL FOR PUSHING OR PULLING FISH TAPE THROUGH A CONDUIT

Elmer V. Hughes, Oceanside, Calif.

Application April 23, 1954, Serial No. 425,283

1 Claim. (Cl. 254—134.3)

The present invention relates to a tool for pushing or pulling fish tape through a conduit.

Such tool must be compact, must be sturdy, and must have two hand grips, since the force necessary, at times, to move the fish tape requires all the strength that one man can exert with both hands and arms. Such tool must also be inexpensive and simple to operate. My invention is for a tool having all of the above characteristics.

Further objects and advantages will be apparent from the following description, reference being had to the accompanying drawings wherein a preferred embodiment of the invention is illustrated.

Figure 1:
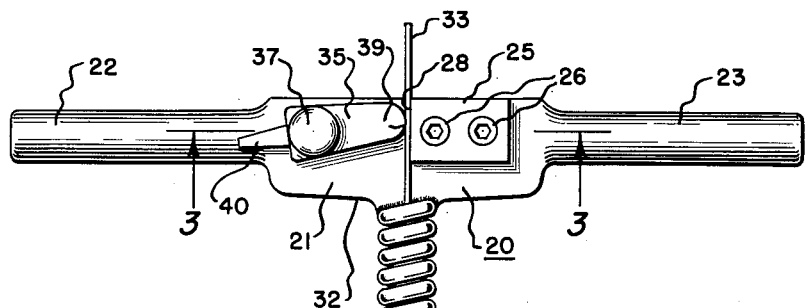
Fig. 1 is a plan view of the tool, part of the tape-guiding tube being broken away and part thereof being shown in section; the wedging cam is shown in tape-pulling position.

Referring more in detail to the drawing, the tool 20 includes a main body or handle 21 forming two hand grips 22 and 23 at opposite ends thereof. While the handle may be made in various shapes, it should be so shaped as to provide two hand grips, and, the preferred embodiment includes aligned grips.

A bearing block 25 is secured to the top side of the main body 21 by screws 26. This block provides a bearing surface or face 28, and this face 28, as viewed in Fig. 2, extends vertically and transversely of the aligned grips 22 and 23; this face 28 lies substantially midway of the ends of the grips and lies in a plane aligned with the axis of a tube 30. One end of this tube 30 is suitably secured to a side wall of the main body 21 as by brazing or welding. Tube 30 is formed of a coil of eight gauge spring steel wire to provide a sturdy tube which will withstand considerable force in an axial direction yet can be flexed when necessary, for example for insertion into the front side of an electrical terminal box having a conduit leading from a side wall thereof.

The fish tape is shown at 33, extending through the guiding tube 30 and along the bearing block face 28. The fish tape is pressed, at will, into binding relationship against the face 28 by a wedging cam 35. Cam 35 is pivotally mounted on a bearing 36 forming part of a screw 37 fastened into the main body 21. The axis of bearing 36 lies parallel with the bearing face 28 of block 25 and the bearing face 39 of cam 35 also lies parallel with face 28. A handle 40 is formed integrally with the cam 35 and is utilized for moving the cam against the fish tape 33.

The cam 35 is of such length that even when the apex of the cam lies closest to the face 28 of block 25, the clearance between the block face 28 and the apex of the cam is slightly less than the thickness of the fish tape 33; thus, after the cam has been moved so that the bearing face 39 thereof bears against the tape, the movement of the main body will effect a locking or clutching action between the tape and the bearing faces 28 and 39 on opposite sides thereof. As viewed and depicted in Fig. 1, wherein the cam is set for upward or pulling movement of the tool 20, such pulling movement, by reason of friction between the tape 33 and bearing face 39, will tend to rotate the cam clockwise and thereby lock the tape between said face 39 and face 28 on block 25. It will be observed that the cam is so constructed that it can be moved, while the fish tape lies along the bearing block surface 28, from the position in which the apex of the cam 35 lies to one side of a plane, lying at right angles to the surface 28 and intersecting the axis of the bearing 36 of the cam, to a position in which the apex of the cam is on the other side of said plane. Such is clearly shown in Figs. 1 and 2, the plane being indicated by the line 3—3. Thus, while the fish tape is in position and after it has been used for either pushing or pulling a fish tape, by merely rotating the cam, for example counterclockwise from the position shown in Fig. 1, to the position shown in Fig. 2, the tool has been converted from a fish line pulling tool to a fish line pushing tool.

Figure 2:
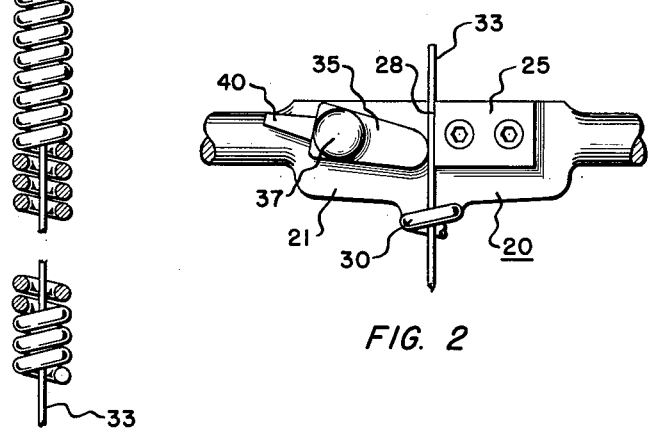
Fig. 2 is a fragmentary view showing the wedging cam in tape-pushing position.

As viewed and depicted in Fig. 2, the cam is set for downward or pushing movement of the tool 20 and such pushing movement will tend to rotate the cam in a counterclockwise direction and thereby lock the tape between said bearing faces 28 and 39.

The fish tape as well as the cam and bearing block are formed of hardened steel. However, only slight pressure need be applied by the finger on the handle 40 of cam 35 to maintain the tape 33 in locked position between bearing faces 28 and 39.

It will be understood that the tape will be clutched, then moved by the tool, then unclutched and the tool retracted, and then clutched and moved again by the tool. For example, in forcing the tape through a conduit, the tape is threaded through the tube 30 and the cam 35 is placed in the position shown in Fig. 2; then the tube with the tape therein is pushed into the conduit. Pressure through a finger or handle 40 is sufficient to hold the cam in tape-locking position. After substantially all of the tube is inserted in the conduit, the finger pressure on handle 40 is released and the tube is partly withdrawn from the conduit. If the tape is not frictionally held in position while the tube is being withdrawn, the operator will manually hold the tape stationary while he withdraws the tube. After the tube is withdrawn the desired distance, finger pressure is again applied to the cam handle while the tool is pushed.

At times the friction offered between the tape and conduit is such that pulling or pushing, as the case may be, requires the strength of two hands and arms of an operator, and, at times two men's strength is required. The present invention provides such tool in that it includes two hand grips on opposite sides of the bearing clamping faces 28 and 39.

Figure 3:
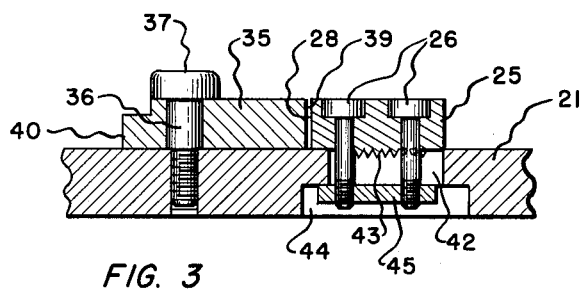
Fig. 3 is a sectional view taken on line 2—2 of Fig. 1, but on a somewhat larger scale.

Fig. 3 shows the parts on full scale. In actual practice the tube 30 is approximately twelve inches in length.

It will be observed from Fig. 3 that the bearing block can be shifted relative to the cam so as to accommodate thicker tape or other material. To accomplish this, the main body 21 is provided with an elongated slot slightly wider than the diameter of the shank of a screw 26. The confronting sides of the bearing block 25 and main body are serrated to form matching teeth 43 (shown exaggerated in Fig. 3), more teeth being provided on the main body than on the bearing block. The under side of the main body is recessed as at 44 for receiving a plate 45; this plate is threaded for receiving the screws 26. To shift the block 25, the screws 26 are loosened sufficiently to permit disengagement of the teeth on the block from those on the main body. After shifting, the screws are retightened.

Thus it is apparent that I have provided a compact and sturdy, yet inexpensive, fish tape pusher-puller tool, and a tool that can be readily and quickly brought into operation.

While the form of embodiment herein shown and described constitutes a preferred form, it is to be understood that other forms may be adopted falling within the scope of the claim that follows:

I claim:

A fish tape pusher-puller tool comprising a handle of sufficient length to provide two hand grips; a flexible tube having one end thereof connected with the handle intermediate the two grips and extending transversely of the handle; a fish tape bearing block on the handle and having an elongated bearing face substantially axially aligned with the opening in said end of the tube; a bearing carried by the handle and extending parallelly of the said bearing face of the block; and a cam pivotally carried by the bearing and having a bearing face confronting the bearing face on the block for clutching a fish tape between the faces, the bearing surface of the bearing block extending on opposite sides of a plane, lying at right angles thereto and intersecting the axis of the bearing for the cam, and said cam being movable, while the tape is in position alongside the bearing surface on the bearing block, from a position in which the apex of the cam is on one side of said plane to a position in which the apex of said cam is on the other side of said plane.

References Cited in the file of this patent

UNITED STATES PATENTS

| | | |
|---|---|---|
| 1,249,947 | Gilbert | Dec. 11, 1917 |
| 1,844,433 | Markowitz | Feb. 9, 1932 |
| 1,880,431 | Goodall | Oct. 4, 1932 |